United States Patent
Kim

(10) Patent No.: US 10,796,279 B1
(45) Date of Patent: Oct. 6, 2020

(54) SYSTEMS AND METHODS FOR AUTOMATED OUTBOUND PROFILE GENERATION

(71) Applicant: COUPANG CORP., Seoul (KR)

(72) Inventor: Je Kim, Bellevue, WA (US)

(*) Notice: Subject to any disclaimer, the term of this patent is extended or adjusted under 35 U.S.C. 154(b) by 0 days.

(21) Appl. No.: 16/842,302

(22) Filed: Apr. 7, 2020

(51) Int. Cl.
G06Q 10/08 (2012.01)
G06Q 10/06 (2012.01)
G06N 20/00 (2019.01)

(52) U.S. Cl.
CPC .......... *G06Q 10/087* (2013.01); *G06N 20/00* (2019.01); *G06Q 10/0637* (2013.01)

(58) Field of Classification Search
CPC ... G06Q 10/087; G06Q 10/0637; G06N 20/00
See application file for complete search history.

(56) References Cited

U.S. PATENT DOCUMENTS

2002/0077929 A1* 6/2002 Knorr ................. G06Q 10/087 705/26.81
2013/0268312 A1* 10/2013 Sharma ............. G06Q 30/0611 705/7.26

* cited by examiner

*Primary Examiner* — A. Hunter Wilder
(74) *Attorney, Agent, or Firm* — Finnegan, Henderson, Farabow, Garrett & Dunner LLP

(57) ABSTRACT

One aspect of the present disclosure is directed to a computer-implemented system for generating an automated outbound profile. The system may include may perform steps including: receiving data comprising a capacity of a fulfillment center (FC); receiving, a plurality of product identifiers associated with incoming products to the FC; periodically collecting and storing transactional logs for the products at the FC using the product identifier; determining a current inventory for the products stored at the FC using the product identifier; generating an outbound profile for the FC using at least one of the transactional logs and the current inventory using a machine learning algorithm; wherein the outbound profile comprises an expected percentage of outgoing products for a plurality of categories of products; and managing network outbound using the generated outbound profile of the FC by comparing the outbound profile to actual outbound capacity of the FC.

18 Claims, 9 Drawing Sheets

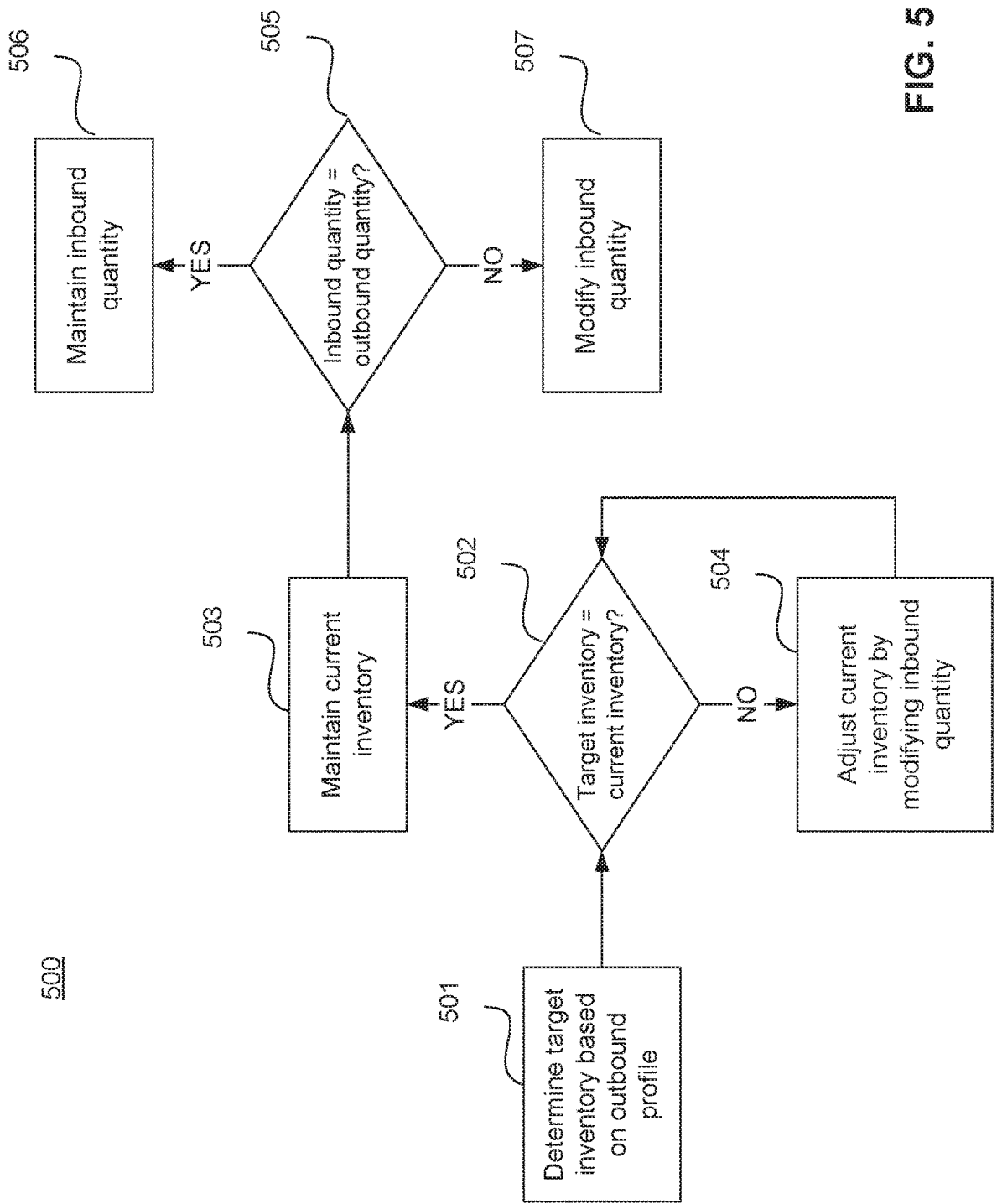

US 10,796,279 B1

SYSTEMS AND METHODS FOR AUTOMATED OUTBOUND PROFILE GENERATION

TECHNICAL FIELD

The present disclosure generally relates to computerized systems and methods for automated outbound profile generation. In particular, embodiments of the present disclosure relate to inventive and unconventional systems relate to applying machine-learning methods to historical shipping data at fulfillment centers to generate profiles accurately representing their outbound capacity.

BACKGROUND

Fulfillment centers (FCs) encounter more than millions of products daily as they operate to fulfill consumer orders as soon as the orders are placed and enable shipping carriers to pick up shipments. Operations for managing inventory inside FCs may include receiving merchandise from sellers, stowing the received merchandise for easy picking access, packing the items, verifying the order, and package delivery. Although currently existing FCs and systems for inventory management in FCs are configured to handle large volumes of incoming and outgoing merchandise, a common issue arises when a FC receives more orders than can be handled because orders are not distributed adequately among multiple FCs. For example, a merchant associated with FCs may order large volumes of products from suppliers for a peak season, but the FCs do not have sufficient resources to receive the ordered products in timely manner. This leads to massive backlog problems at the FCs by slowing down the receiving process, which may eventually exacerbate the problems. The backlog problems may result a loss in sales because it hampers the merchant from circulating products to make profits.

To mitigate such problems, conventional inventory management systems rely on forecast data to determine the distribution of products to multiple FCs, as well as manually generated outbound profiles for each FC. These systems suffer from technical problems in that they do not factor in the individual capabilities of each FC, such as their inbound capacity or outbound capacity for the particular product. Without taking these factors into consideration, these systems may generate a distribution of products among the FCs, where a particular FC may not have enough inventory, inbound capacity, or outbound capacity to meet the demand for a particular product. This may also result in a loss of sales. Further, these systems require manual determination of outbound profiles for FCs, which can be very inaccurate and may greatly increase costs.

Therefore, there is a need for improved methods and systems for intelligently and automatically generating outbound profiles for a plurality of FCs that are further based on the distinct capabilities and traits of each FC.

SUMMARY

One aspect of the present disclosure is directed to a computer-implemented system for generating an automated outbound profile. The system may include: at least one processor; at least one database; a memory comprising instructions that, when executed by the at least one processor, performs steps including: receiving data comprising a capacity of a fulfillment center (FC); receiving, a plurality of product identifiers associated with a plurality of incoming products to the FC; periodically collecting and storing transactional logs for the plurality of products at the FC using the product identifier; determining a current inventory for the plurality of products stored at the FC using the product identifier; generating using a machine learning algorithm, an outbound profile for the FC using at least one of the transactional logs and the current inventory; wherein the outbound profile comprises an expected percentage of outgoing products for a plurality of categories of products; and managing network outbound using the generated outbound profile of the FC by comparing the outbound profile to actual outbound capacity of the FC.

Another aspect of the present disclosure is directed to a computer-implemented method for generating an automated outbound profile. The method may include: receiving data comprising a capacity of a fulfilment center (FC); receiving, a product identifier associated with every incoming product to the FC; periodically collecting and storing transactional logs for every product at the FC using the product identifier; retrieving historical transactional logs for the FC; determining a current inventory for every product at the FC using the product identifier; generating using a machine learning algorithm, an outbound profile for the FC using at least one of the transactional logs and the current inventory.

Yet another aspect of the present disclosure is directed to a computer-implemented system for generating plurality of automated outbound profiles. The system may include: at least one processor; at least one database; a memory comprising instructions that, when executed by the at least one processor, performs steps comprising: receiving data comprising a capacity of a fulfillment center (FC); receiving, a plurality of product identifiers associated with a plurality of incoming products to the FC; periodically collecting and storing transactional logs for the plurality of products at the FC using the product identifier; determining a current inventory for the plurality of products stored at the FC using the product identifier; storing in a database a plurality of transactional logs and current inventories from a plurality of FCs, the plurality transactional logs and current inventories containing transactional data; dividing transactional data into a training dataset and a validation dataset, the training dataset having more data than the validation dataset; generating, using a machine learning algorithm, a predictive model based on the training data set; validating the predictive model using the validation dataset; and generating the outbound profile for the FC by applying the predictive model to the associated transactional logs and current inventory, wherein the outbound profile comprises an expected percentage of outgoing products for a plurality of categories of products; and managing network outbound using the generated outbound profile of the FC by comparing the outbound profile to actual outbound capacity of the FC.

Other systems, methods, and computer-readable media are also discussed herein.

BRIEF DESCRIPTION OF THE DRAWINGS

FIG. 5 is a flow chart of exemplary process and/or logic that may be used to manage inventory levels based on an outbound profile, consistent with the disclosed embodiments.

DETAILED DESCRIPTION

Figure 1A:
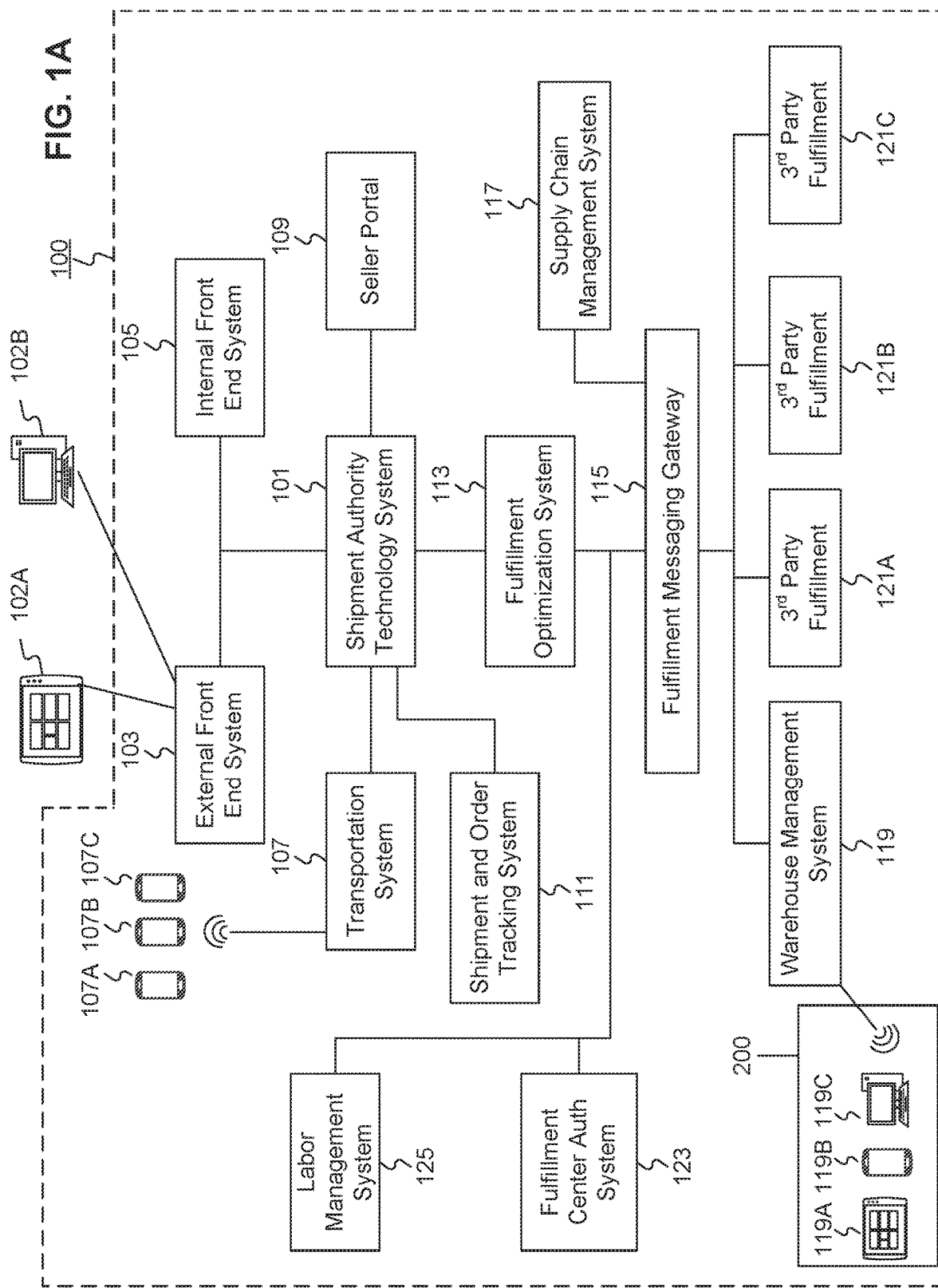
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for applying machine-learning methods to historical shipping data at fulfillment centers to generate a profiles accurately representing their outbound capacity.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 1078, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 1196, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
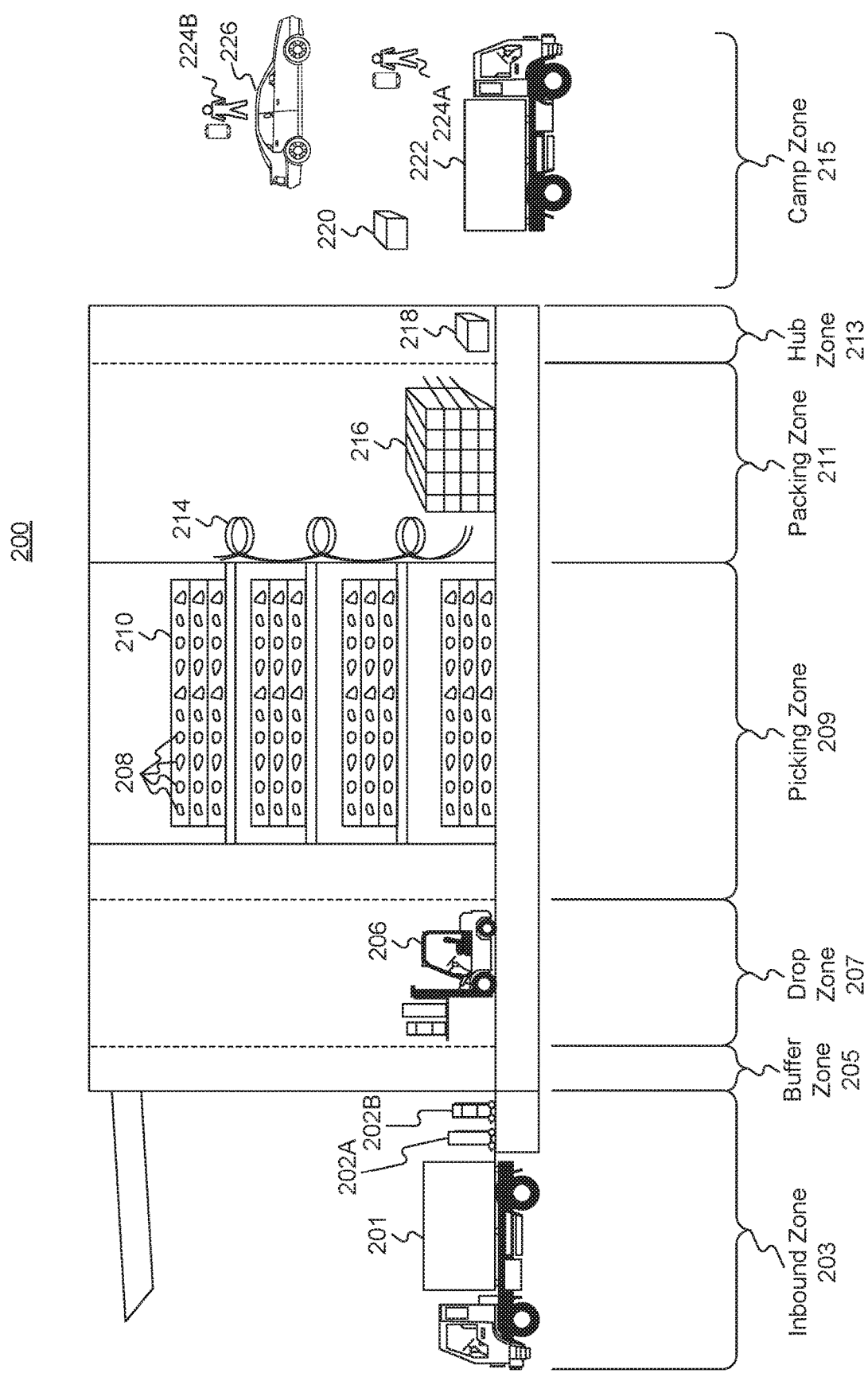
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
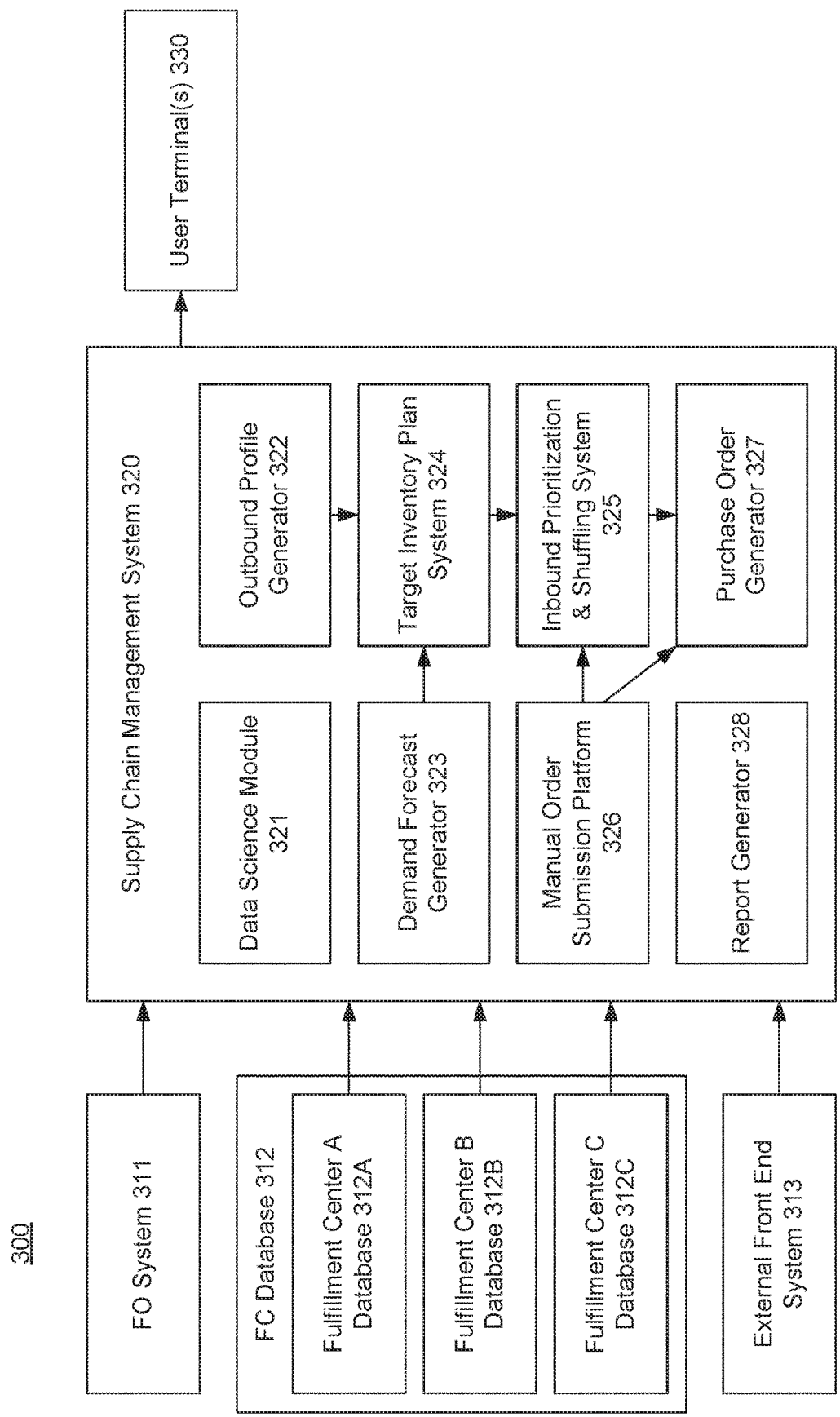
FIG. 3 is a schematic block diagram illustrating an exemplary embodiment of a networked environment comprising computerized systems for keeping product inventory at an optimum level, consistent with the disclosed embodiments.

FIG. 3 is a schematic block diagram illustrating an exemplary embodiment of a networked environment 300 comprising computerized systems for keeping product inventory at an optimum level. Environment 300 may include a variety of systems, each of which may be connected to one another via one or more networks. The systems may also be connected to one another via a direct connection, for example, using a cable. The depicted systems include an FO system 311, an FC database 312, an external front end system 313, a supply chain management system 320, and one or more user terminals 330. FO system 311 and external front end system 313 may be similar in design, function, or operation to FO system 113 and external front end system 103 described above with respect to FIG. 1A.

FC database 312 may be implemented as one or more computer systems that collect, accrue, and/or generate various data accrued from various activities at FC 200 as described above with respect to FIG. 2. For example, data accrued at FC database 312 may include, among others, product identifiers (e.g., stock keeping unit (SKU)) of every product handled by a particular FC (e.g., FC 200), an inventory level of each product over time, and frequency and occurrences of out of stock events for each product.

In some embodiments, FC database 312 may comprise FC A database 312A, FC B database 312B, and FC C database 312C, which represent databases associated with FCs A-C. While only three FCs and corresponding FC databases 312A-C are depicted in FIG. 3, the number is only exemplary and there may be more FCs and a corresponding number of FC databases. In other embodiments, FC database 312 may be a centralized database collecting and storing data from all FCs. Regardless of whether FC database 312 includes individual databases (e.g., 312A-C) or one centralized database, the databases may include cloud-based databases or on-premise databases. Also in some embodiments, such databases may comprise one or more hard disk drives, one or more solid state drives, or one or more non-transitory memories.

Supply Chain Management System (SCM) 320 may be similar in design, function, or operation to SCM 117 described above with respect to FIG. 1A. Alternatively or additionally, SCM 320 may be configured to aggregate data from FO system 311, FC database 312, and external front end system 313 in order to forecast a level of demand for a particular product and generate one or more purchase orders in a process consistent with the disclosed embodiments.

In some embodiments, SCM 320 comprises a data science module 321, an outbound profile generator (OPG) 322, a demand forecast generator 323, a target inventory plan system (TIP) 324, an inbound prioritization and shuffling system (IPS) 325, a manual order submission platform 326, a purchase order (PO) generator 327, and a report generator 328.

In some embodiments, SCM 320 may comprise one or more processors, one or more memories, and one or more input/output (I/O) devices. SCM 320 may take the form of a server, general-purpose computer, a mainframe computer, a special-purpose computing device such as a graphical processing unit (GPU), laptop, or any combination of these computing devices. In these embodiments, components of SCM 320 (i.e., data science module 321, OPG 322, demand forecast generator 323, TIP 324, IPS 325, manual order submission platform 326, PO generator 327, and report generator 328) may be implemented as one or more functional units performed by one or more processors based on instructions stored in the one or more memories. SCM 320 may be a standalone system, or it may be part of a subsystem, which may be part of a larger system.

Alternatively, components of SCM 320 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

Data science module 321, in some embodiments, may include one or more computing devices configured to determine various parameters or models for use by other components of SCM 320. For example, data science module 321 may develop a forecast model used by demand forecast generator 323 that determines a level of demand for each product. In some embodiments, data science module 321 may retrieve order information from FO system 311 and glance view (i.e., number of webpage views for the product) from external front end system 313 to train the forecast model and anticipate a level of future demand. The order information may include sales statistics such as a number of items sold over time, a number of items sold during promotion periods, and a number of items sold during regular periods. Data science module 321 may train the forecast model based on parameters such as the sales statistics, glance view, season, day of the week, upcoming holidays, and the like. In some embodiments, data science module 321 may also receive data from inbound zone 203 of FIG. 2 as products ordered via POs generated by PO generator 327 are received. Data science module 321 may use such data to determine various supplier statistics such as a particular supplier's fulfillment ratio (i.e., a portion of products that are received in a saleable condition compared to an ordered quantity), an estimated lead time and shipping period, or the like. Data science module 321 may receive, on a recurring or periodic basis, data from FC database 312. This data may include, for example, data, product identifiers (e.g., SKUs) of every product handled by a particular FC (e.g., FC 200), an inventory level of each product over time, and frequency and occurrences of out of stock events for each product. OPG 322 may then generate a profile for each FC based on the parameters received by data science module 311. Generating the profile may, in some embodiments, aggregating the data and parameters received from FC database into a one or more sets of data, where the profile is comprised of the one or more sets of data.

In some embodiments, the FC database may include a historical inventory database to store historical inventory for the FC. For example, the historical inventory data may include or identify at least one of products currently and previously stored in the FC, times at which the products were stored and shipped from the FC, time period for which the products were stored in the FC, prices of the products, brands of the products, or the like.

Demand forecast generator 323, in some embodiments, may include one or more computing devices configured to forecast a level of demand for a particular product using the forecast model developed by data science module 321. More specifically, the forecast model may output a demand forecast quantity for each product, where the demand forecast quantity is a specific quantity of the product expected to be sold to one or more customers in a given period (e.g., a day). In some embodiments, demand forecast generator 323 may output demand forecast quantities for each given period over a predetermined period (e.g., a demand forecast quantity for each day over a 5-week period). Each demand forecast quantity may also comprise a standard deviation quantity (e.g., ±5) or a range (e.g., maximum of 30 and minimum of 25) to provide more flexibility in optimizing product inventory levels.

OPG 322, in some embodiments, may include one or more computing devices configured to generate a profile for each FC in the system (e.g., FCs A, B, C) using a model developed by data science module 321. More specifically, the profile model may output, for each FC, an inbound capacity representing the quantity of a SKU that the FC may receive in a specified amount of time, an outbound capacity representing the quantity of a SKU that the FC may deliver in a specified amount of time, a quantity representing the current inventory of the SKU at the FC, and a quantity of currently ordered SKUs at each FC. These traits may be based on historical data representing the operations of each FC that may indicate the capabilities of each FC regarding the inbound and outbound flows of one or more SKUs.

Target Inventory Plan (TIP) system 324, in some embodiments, may include one or more computing devices configured to determine a recommended order quantity for each product. TIP 324 may determine the recommended order quantity by first determining preliminary order quantities for the products and constraining the preliminary order quantities with real-world constraints.

TIP 324 may receive a demand forecast quantity for each product from demand forecast generator 323. In some embodiments, the demand forecast quantities may be in the form of a table of numerical values organized by SKU in one dimension and number of units forecasted to be sold for a given day in the other dimension. The table may also comprise additional dimensions devoted to other parameters of the demand forecast quantity such as standard deviation, maximum, minimum, average, or the like. Alternatively, the demand forecast quantities may take the form of multiple arrays of values organized by SKU and dedicated to each parameter. Other suitable forms of organizing the same data are equally applicable as known in the art and are within the scope of this invention.

In some embodiments, TIP 324 may receive, from data science module 321, supplier statistics data of one or more suppliers that supply the products. The supplier statistics data may comprise a set of information (e.g., fulfillment ratio described above) associated with each supplier. In some embodiments, there may be multiple sets of supplier statistics data for a particular supplier where each set of data is associated with a particular product supplied by the supplier.

TIP 324 may also receive, in some embodiments, from OPG 322, a profile including the inbound capacity, outbound capacity, current product inventory levels and currently ordered quantities of each SKU. The current product inventory level may refer to an instantaneous count of a particular SKU at the time of data retrieval, and the currently ordered quantity may refer to a total quantity of a particular product that has been ordered through one or more POs generated in the past and is waiting for delivery to corresponding FCs.

TIP 324 may determine recommended order quantities for each product by determining preliminary order quantities for each product and reducing the preliminary order quantities based on a range of parameters. In some embodiments, a preliminary order quantity for a particular product may be a function of at least one of its demand forecast quantity, a coverage period, a safety stock period, current inventory level, currently ordered quantity, a critical ratio, and a case quantity. For example, TIP 324 may determine a preliminary order quantity with formula (1):

$$Q_p = \text{ceiling}\left(\frac{\left(\sum_{n=0}^{P_c+P_s-1} Q_{fn}\right) - Q_c - Q_o}{C}\right) \cdot C \quad (1)$$

where $Q_p$ is a preliminary order quantity for a particular product; $Q_{fn}$ is a demand forecast quantity of the product for nth day from the time of calculation; $Q_c$ is the current inventory level of the product; $Q_o$ is the currently ordered quantity; $P_c$ is the coverage period; $P_s$ is the safety stock period; and C is the case quantity.

As used herein, a coverage period may refer to a length of time (e.g., number of days) one PO is planned to cover; and a safety stock period may refer to an additional length of time (e.g., additional number of days) the PO is should cover in case of an unexpected event such as a sudden increase in demand or a delayed delivery. For example, given the following table of sample demand forecast quantities for product X, a coverage period for a PO generated at D-day may be 5 and a safety stock period may be 1, in which case, $$\sum_{n=0}^{P_c+P_s-1} Q_{fn}$$

would equal 3 i+37+35+40+41+34=224.

TABLE 1

Sample demand forecast quantity for product X over 9 days

| Forecast | D | D + 1 | D + 2 | D + 3 | D + 4 | D + 5 | D + 6 | D + 7 | D + 8 |
|---|---|---|---|---|---|---|---|---|---|
| $Q_f$ | 37 | 37 | 35 | 40 | 41 | 34 | 37 | 39 | 41 |

From this quantity, 224 units of product X, TIP 324 may subtract the current inventory level (e.g., 60 units) and the currently ordered quantity (e.g., 40), which comes out to be 124 units. This number may then be rounded up to a multiple of the case quantity (i.e., the number of units that the product comes packaged in such as the number of units in a box or a pallet) by being divided by the case quantity, being rounded up to an integer, and being multiplied by the case quantity again, which, in this example, comes out to be 130 units assuming a case quantity of 10 as an example.

In some embodiments, the coverage period may be a predetermined length of time equal to or greater than an expected length of time a corresponding supplier may take to deliver the products from the date of PO generation. Additionally or alternatively, TIP 324 may also adjust the coverage period based on other factors such as the day of the week, anticipated delay, or the like. Furthermore, the safety stock period may be another predetermined length of time designed to increase the preliminary order quantity as a safety measure. The safety stock period may reduce the risk of running out of stock in case of unexpected events such as a sudden increase in demand or an unanticipated shipping delay. In some embodiments, TIP 324 may set the safety stock period based on the coverage period, where, for example, a safety stock period of 0 days is added when a coverage period is 1-3 days, 1 day is added when a coverage period is 4-6 days, and 3 days are added when a coverage period is greater than 7 days.

Despite the complex process of determining the preliminary order quantities described above, the preliminary order quantity may be based primarily on customer demand and not take real-world constraints into account. Steps for accounting for such constraints are thus desired in order to optimize product inventories. TIP 324, in some embodiments, may adjust the preliminary order quantities using a set of rules configured to fine tune the preliminary order quantities based on data such as sales statistics, the current product inventory levels and the currently ordered quantities. The resulting quantities, recommended order quantities, may be transmitted to PO generator 327.

In addition, IPS 325, in some embodiments, may include one or more computing devices configured to determine a popularity for each product, prioritize the order quantity based on the determined popularity, and distribute the prioritized order quantity to one or more FCs 200.

Manual order submission platform 326, in some embodiments, may include one or more computing devices configured to receive user inputs for one or more manual orders. Manual order submission platform 326 may comprise a user interface accessible by a user via one or more computing devices such as internal front end system 105 of FIG. 1A. In one aspect, the manual orders may include extra quantities of certain products that the user may deem necessary and allow manual adjustments (e.g., increasing or decreasing by a certain amount) of the preliminary order quantities, the recommended order quantities, the prioritized order quantities, or the distributed order quantities. In another aspect, the manual orders may include a total quantity of certain products that should be ordered as determined by an internal user instead of the order quantities determined by SCM 320. An exemplary process of reconciling these user-determined order quantities with SCM-generated order quantities is explained below in more detail with respect to FIG. 5. Still further, a user may specify, in some embodiments, a particular FC as a receiving location so that the manual orders may get assigned to the particular FC. In some embodiments, portions of the order quantities submitted via manual order submission platform 326 may be marked or flagged (e.g., by updating a parameter associated with the portion of the order quantity) so that they may not be adjusted (i.e., constrained) by TIP 324 or IPS 325.

In some embodiments, manual order submission platform 326 may be implemented as a computer or computers running software such as the Apache HTTP Server, Microsoft Internet Information Services (IIS), NGINX, or the like. In other embodiments, manual order submission platform 326 may run a custom web server software designed to receive and process user inputs from one or more user terminals 330 and provide responses to the received user inputs.

PO generator 327, in some embodiments, may include one or more computing devices configured to generate POs to one or more suppliers based on the recommended order quantities or results of the distribution by IPS 325. SCM 320, by this point, would have determined a recommended order quantity for each product that requires additional inventory and for each FC 200, where each product has one or more suppliers that procure or manufacture the particular product and ship it to one or more FCs. A particular supplier may supply one or more products, and a particular product may be supplied by one or more suppliers. When generating POs, PO generator 327 may issue a paper PO to be mailed or faxed to the supplier or an electronic PO to be transmitted to the same.

Report generator 328, in some embodiments, may include one or more computing devices configured to generate reports periodically in response to a predetermined protocol or on-demand in response to user inputs via, for example, user terminals 330 or internal front end system 105 of FIG. 1A. The reports may range from simple ones that output certain information such as the recommended order quantity for a particular product to complex ones that require analysis of historical data and visualize such information in a graph. More specifically, report generator 328 may generate reports including information such as how order quantities changed from the forecasted quantities to final quantities at each step of the adjustments performed by SCM 320; a history of how much resources at each FC 200 were utilized; differences between the forecasted quantities and the final quantities (i.e., quantities that had to be reduced from the forecasted quantities in order to account for real-world limitations) by product category; and the like.

User terminals 330, in some embodiments, may include one or more computing devices configured to enable internal users such as those working at an FC 200 to access SCM 320 via manual order submission platform 326 or report generator 328. User terminals 330 may include any combination of computing devices such as personal computers, mobile phones, smartphones, PDAs, or the like. In some embodiments, the internal users may use user terminals 330 to access a web interface provided by manual order submission platform 326 in order to submit one or more manual orders.

Figure 4:
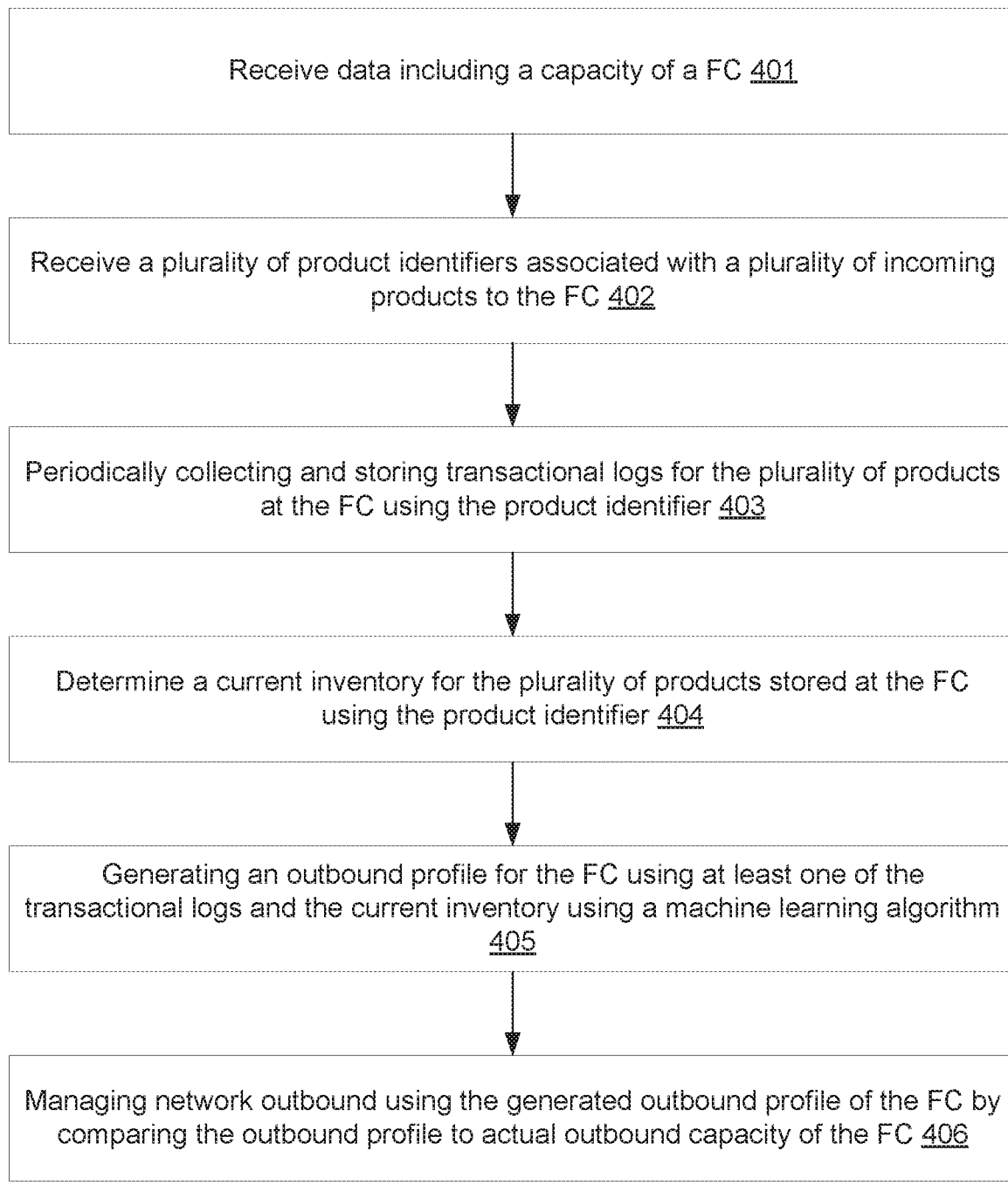
FIG. 4 is a flowchart of an exemplary computerized process for intelligent automated generation of outbound profiles for one or more fulfillment centers, consistent with the disclosed embodiments.

FIG. 4 is a flowchart of an exemplary computerized process 400 for intelligent automated generation of outbound profiles for one or more FCs (e.g., FC 200). In preferred embodiments, process 400 may be executed by one or more components of SCM 320, such as OPG 322, TIP 324, or IPS 325. Thus, by way of example, process 400 is described as being executed by OPG 322. However, process 400 or a portion thereof may be performed by the network environment 300 as a whole or by any component of environment 300 capable of performing at least a portion of the process (e.g., one or more processors, OPG 322, Demand Forecast Generator 323, etc.).

Process 400 begins at step 401, where OPG 322 may receive data including a capacity of a fulfillment center receiving data including a capacity of a FC. The capacity of an FC may include a maximum or estimated maximum amount of inventory that the FC may hold, or a maximum or estimated maximum number of products that may be shipped from the FC in a specified period of time.

After step 401, process 400 may continue to step 402. At step 402, OPG 322 may receive a plurality of product identifiers associated with a plurality of incoming products to the FC. For example, when a customer places an order, the order or the items in the order may be assigned to one or more FCs based on factors such as the shipping location, the products ordered, the availability of each of the products order at each FC, etc. Once assigned, assignment of the order or the items to a particular FC may be stored in a database within system 100 (e.g., FC database 312). Thus, in some embodiments, OPG 322 may receive the assignments of each item and associated identifiers, indicating which items are incoming to each FC.

After step 402, process 400 may continue to step 403. At step 403, OPG 322 may collect and store transactional logs for the plurality of products at the FC using the received product identifiers. The transactional logs may be stored, for example, in a database (e.g. FC database 312) accessible by OPG 322. In some embodiments, the transactional logs may include at least one of customer orders assigned to the FC, incoming products assigned to the FC, times at which the products were received at the FC, amount of time the products were stored, times at which the products were shipped from the FC, number of brands coming into the FC, top brands shipping out of the FC, availability of products at the FC, or number of products for different brands shipping out of the FC. Collection and storing of these transactional logs may take place continuously or on a periodic basis (e.g., once a day or once a week).

After step 403, process 400 may continue to step 404. At step 404, OPG 322 may determine a current inventory for the plurality of products stored at the FC using the product identifier. OPG 322 may be able to make this determination, for example, by consulting the transactional logs discussed with respect to step 403 to determine the amount of products associated with one or more product identifiers remain present in the FC's inventory.

After step 404, process 400 may continue to step 405. At step 405, OPG 322 may generate an outbound profile for the FC using at least one of the transactional logs and the current inventory using a machine learning algorithm. The outbound profiles may include a plurality of metrics relating to the outbound capacity and expectations of the FC, such as an expected percentage of outgoing products for a plurality of categories of products. The categories may include, in some embodiments, total inventory at the FC, brands, top sellers, prices ranges, or shipping locations. In some embodiments, the outbound profile for the FC may include a number, rather than a percentage, of expected outgoing products during a specific period from the FC. The specific period could be any set and measured in any amount of time, such as hours, days, weeks, months, or years. In some embodiments, the outbound profile may be generated for an upcoming event using the historical inventory data. An upcoming event may, for example, be an expected sale where specified items are sold to customers at a discounted price. An upcoming event may also be an expected period of time where sales are expected to be substantially higher or lower (e.g., more products may be expected to be sold as gifts during holiday periods).

As discussed above with reference to step 404, OPG 322 may generate an outbound profile using a machine learning algorithm. In some embodiments, the outbound profile may be generated using a reinforcement algorithm. In some embodiments, this may occur when OPG 322 utilizes a predictive model generated by the machine learning algorithm to generate the profile. In some embodiments, the machine learning algorithm may be executed by data science module 321 to generate the predictive models. Generating the predictive models may include dividing the transactional log data into a training dataset and a validation dataset, the training dataset having more data than the validation dataset, and generating a predictive model based on the training data set. For example, the transactional logs may be retrieved from a database (e.g., FC database 312), the transactional data indicating information associated with previous output through the FC. Data science module 321 may use a larger portion of this data (i.e., training data set) to generate the predictive model. The predictive model may be an equation in the form of one or more general statistical models, such as a linear regression (e.g., Lasso regression, Ridge regression, Elastic Net regression, Huber regression, Passive Aggressive regression, RANSAC regression, SGD regression, etc.), non-linear regression (e.g., $K^{th}$ nearest neighbor, Categorization and Regression Tree, SVM regression, etc.), ensemble regression (e.g., ADA, bagging, random forest, gradient boosting, etc.), or a logistic regression representing the relationship between the electronic request information and the associated FCs.

After data science module 321 has generated a predictive model, it may, in some embodiments, validate the predictive model using the validation dataset. The validation dataset may be at least a portion of the transactional log data that was not used in generating the predictive model. To validate the predictive model, data module 321 may generate a set of outbound profiles for each FCs for each electronic request in the validation data set and compare the predicted associated outbound profiles to the actual outbound data FC. The predictive model may be validated if, for example, it meets a pre-determined confidence threshold (e.g., the model predicted at least 95% of associated FCs correctly). In some embodiments, validation may occur by comparing the performance of the predictive models against validation data sets, and selecting the predictive model with the lowest error (e.g., root mean square error). After the predictive model has been validated, OPG 322 may receive and apply the model to generate at least one outbound profile for an FC.

In some embodiments, the machine learning algorithm may be continuously or periodically improved by training the machine learning algorithm using a rewards system. For example, data science module 321 may assign "points" to an algorithm when the generated predictive model predicts the outbound shipments at an FC to a high degree of certainty. Data science module 321 may be configured to adjust or improve the machine learning algorithm based on the amount of "points" it receives for a given predictive to so that it continues to reproduce similar results.

In some embodiments, outbound profiles may be generated at an FC level, a regional level, and a national level. For example, the generation of outbound profiles has been discussed with reference to FCs. However, in some embodiments, an outbound profile may be generated for a region containing a plurality of FCs. As discussed previously, the outbound FC profiles may be generated using transactional logs and inventory levels for the FC. However, these transactional logs and inventory may be aggregated on a regional level in order to determine an outbound profile for a specified region, or they may be aggregated on a national level to generate an outbound profile for an entire nation.

After step 405, process 400 may continue to step 406. At step 406, the system manages the network outbound using the generated outbound profile of the FC by comparing the outbound profile to actual outbound capacity of the FC. This step may, in some embodiments, be executed by TIP 324. For example, TIP 324 may determine, based on comparing the outbound profiles of each FC to their actual outbound capacity, that some orders must be assigned or reassigned to different FCs in order to prevent one or more FCs from being assigned to fulfill orders outside of their capacity, which may result in delayed delivery, lost items, etc. In another example, TIP 324 may compare the outbound profiles of each FC to their actual outbound capacity, and determine that the expected outbound to meet demand at the FC exceeds the outbound capacity of an FC, and thus additional resources, storage space, or workers are needed to increase the outbound capacity of the FC in order to meet the demand. Upon making this determination, TIP 324 may, in some embodiments, transmit instructions to a device (e.g., devices 119A, 119B, and 119C of WMS 119) that cause the device to display a notification that one or more of additional resources, storage space, workers, etc. are required to increase the FC capacity. On a regional or national level, for example, managing the network outbound may include determining whether and where new FCs and/or warehouses should be built in order to increase outbound capacity.

Managing the network outbound may also include inventory planning, such as setting a target inventory level at each FC and managing the inbound shipment of products to one or more FCs so that the demand may be met. For example, IPS 325 may determine a target inventory level set to meet the expected outbound level derived from the FC profile, and further determine whether more or less of a given item should be sent as inbound to an FC based on the target inventory level.

FIG. 5 provides a flow chart of exemplary process and/or logic 500 that may be used to manage inventory levels based on an outbound profile. This process may be executed by the one or more processors of IPS 325, for example. Process 500 may begin at step 501 after IPS 325 has determined a target inventory for a particular product based on an outbound profile. The one or more processors may then determine at step 502 whether the current inventory of the product at the FC is equal to the target inventory. This determination of whether the current inventory is "equal" to the target inventory may, in some embodiments, be based on the exact quantity or absolute value of the current inventory matches the exact quantity or absolute value of the target inventory. If the current inventory is equal to the target inventory, then the one or more processor will transmit instructions to maintain the current inventory of the product at the FC at step 503. The one or more processors may further determine whether the current inbound quantity of the product at the FC is equal to the outbound quantity of the product at the FC at step 505. If so, the one or more processors may transmit instructions to the device to maintain the inbound quantity at step 506 so that the current inventory remains the same. Otherwise, the one or more processors may transmit instructions to modify the inbound quantity so that it becomes equal to the outbound quantity at step 507.

In the alternative, at step 502, the one or more processors may determine that the current inventory is not equal to the target inventory. In this case, to prevent OOS or overstock, the one or more processors may transmit instructions to the device to modify the inbound quantity of the product at the FC at step 504. For example, if it is determined that current inventory is lower than the target inventory, then the transmitted instructions may be to modify the inbound quantity of the product so that the inbound quantity is greater than the outbound quantity. In contrast, if the current inventory of the product is higher than the target inventory, the instructions may be to modify the inbound quantity so that the inbound quantity is lower than the outbound quantity. The process may return to step 502, and the current inventory may continue to be adjusted until it is equal to the target inventory. Further, while this process is described as an order of steps, the one or more processors may be configured to continuously assess and modify the current inventory level by continuously making the above-described determinations (e.g., at steps 502 and 505). Although process 500 has been described as managing an inbound quantity of shipments at an FC based on an FC outbound profile, the same process or similar processes may be used to manage an inbound quantity shipments to a regional area or a national area based on generated regional and national outbound profiles, respectively.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for generating an automated outbound profile, comprising:
   at least one processor;
   at least one database; and
   a memory comprising instructions that, when executed by the at least one processor, performs steps comprising:
      receiving data comprising a capacity of a fulfillment center (FC);
      receiving, a plurality of product identifiers associated with a plurality of incoming products to the FC;
      periodically collecting and storing transactional logs for the plurality of products at the FC using the product identifier;
      determining a current inventory for the plurality of products stored at the FC using the product identifier;
      storing in a database a plurality of transactional logs and current inventories from a plurality of FCs, the plurality transactional logs and current inventories containing transactional data;
      dividing transactional data into a training dataset and a validation dataset, the training dataset having more data than the validation dataset;
      generating, using a machine learning algorithm, a predictive model based on the training data set;
      validating the predictive model using the validation dataset;
      generating an outbound profile for the FC by applying the predictive model to the associated transactional logs and current inventory, wherein the outbound profile comprises an expected percentage of outgoing products for a plurality of categories of products; and
      managing network outbound using the generated outbound profile of the FC by comparing the outbound profile to actual outbound capacity of the FC, wherein managing network outbound comprises assigning orders to different FCs in order to prevent one or more FCs from being assigned to fulfill orders outside of their capacity.

2. The computer-implemented system of claim 1, wherein transactional logs comprise at least one of customer orders assigned to the FC, incoming products assigned to the FC, times at which the products were received at the FC, amount of time the products were stored, times at which the products were shipped from the FC, number of brands coming into the FC, top brands shipping out of the FC, availability of products at the FC, or number of products for different brands shipping out of the FC.

3. The computer-implemented system of claim 1, wherein the outbound profile for the FC further comprises of number of expected outgoing products during a specific period from the FC.

4. The computer-implemented system of claim 3, wherein the specific period may be measured in at least one of days, months, or years.

5. The computer-implemented system of claim 1, wherein categories of products comprise at least one of total inventory at the FC, brands, top sellers, price ranges, or shipping locations.

6. The computer-implemented system of claim 1, wherein the instructions further comprise generating outbound profiles at an FC level, regional level and national level.

7. The computer-implemented system of claim 1, wherein the instructions further comprise training the machine learning algorithm to periodically update the outbound profile based on the information stored in the transactional logs.

8. The computer-implemented system of claim 1, wherein the database includes a historical inventory database to store historical inventory data for the FC, the historical inventory data identifying, at least, products stored in the FC, times at which the products were stored and shipped from the FC, time periods for which the products were stored in the FC, prices of the products, and brands of the products.

9. The computer-implemented system of claim 8, wherein the outbound profile is generated for an upcoming event using the historical inventory data.

10. A computer-implemented method for generating an automated outbound profile, the method comprising:
   receiving data comprising a capacity of a fulfilment center (FC);
   receiving, a product identifier associated with every incoming product to the FC;
   periodically collecting and storing transactional logs for every product at the FC using the product identifier;
   determining a current inventory for every product at the FC using the product identifier;
   storing in a database a plurality of transactional logs and current inventories from a plurality of FCs, the plurality transactional logs and current inventories containing transactional data;
   dividing transactional data into a training dataset and a validation dataset, the training dataset having more data than the validation dataset;
   generating, using a machine learning algorithm, a predictive model based on the training data set;
   validating the predictive model using the validation dataset;
   generating an outbound profile for the FC by applying the predictive model to the associated transactional logs and current inventory, wherein the outbound profile comprises an expected percentage of outgoing products for a plurality of categories of products; and
   managing network outbound using the generated outbound profile of the FC by comparing the outbound profile to actual outbound capacity of the FC, wherein managing network outbound comprises assigning orders to different FCs in order to prevent one or more FCs from being assigned to fulfill orders outside of their capacity.

11. The computer-implemented method of claim 10, wherein transactional logs comprise at least one of customer orders assigned to the FC, incoming products assigned to the FC, times at which every product was received at the FC, amount of time every product was stored, times at which every product was shipped from the FC, number of brands coming into the FC, top brands shipping out of the FC, availability of products at the FC, and number of products for different brands shipping out of the FC.

12. The computer-implemented method of claim 10, wherein the outbound profile for the FC comprises of number of expected outgoing products during a specific period from the FC.

13. The computer-implemented method of claim 10, wherein the specific period may be measured in at least one of days, months or years.

14. The computer-implemented method of claim 12, wherein number of expected outgoing products is based on at least one of total inventory at the FC, brands, top sellers, price ranges, and shipping locations.

15. The computer-implemented method of claim 10, further comprising generating outbound profiles at an FC level, regional level and national level.

16. The computer-implemented method of claim 10, further comprising training the machine learning algorithm to periodically update the outbound profile based on the information stored in the transactional logs.

17. The computer-implemented method of claim 10, further comprising storing historical inventory data for the FC, the historical inventory data identifying, at least, products stored in the FC, times at which the products were stored and shipped from the FC, time periods for which the products were stored in the FC, prices of the products, and brands of the products.

18. The computer-implemented method of claim 17, wherein the outbound profile is generated for an upcoming event using the historical inventory data.

* * * * *

UNITED STATES PATENT AND TRADEMARK OFFICE
CERTIFICATE OF CORRECTION

Page 1 of 1

PATENT NO. : 10,796,279 B1
APPLICATION NO. : 16/842302
DATED : October 6, 2020
INVENTOR(S) : Je Kim It is certified that error appears in the above-identified patent and that said Letters Patent is hereby corrected as shown below:

On the Title Page

Following item (72), add:
(73) Assignee: Coupang Corp., Seoul (KR)

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*